United States Patent [19]

Pechar

[11] Patent Number: 4,708,184

[45] Date of Patent: Nov. 24, 1987

[54] TIRE PRESSURE REGULATING UNIT

[75] Inventor: Franz Pechar, Neu-Ulm, Fed. Rep. of Germany

[73] Assignee: Iveco Magirus AG, Ulm, Fed. Rep. of Germany

[21] Appl. No.: 648,633

[22] Filed: Sep. 7, 1984

[30] Foreign Application Priority Data

Sep. 10, 1983 [DE] Fed. Rep. of Germany ....... 3332677

[51] Int. Cl.$^4$ .............................................. B60C 23/00
[52] U.S. Cl. .................................... 152/417; 137/102; 141/37; 152/427
[58] Field of Search ............... 152/415, 416, 417, 427, 152/429; 137/223, 226, 228, 230, 102; 141/37, 47

[56] References Cited

U.S. PATENT DOCUMENTS

| | | | |
|---|---|---|---|
| 4,313,483 | 2/1982 | Brockmann | 152/416 |
| 4,421,151 | 12/1983 | Stumpe | 152/416 |
| 4,640,331 | 2/1987 | Braun et al. | 152/417 |

FOREIGN PATENT DOCUMENTS

| | | | |
|---|---|---|---|
| 2008437 | 9/1971 | Fed. Rep. of Germany | 152/416 |
| 2800662 | 7/1979 | Fed. Rep. of Germany | 152/415 |
| 2826635 | 1/1980 | Fed. Rep. of Germany | 152/417 |

*Primary Examiner*—Donald E. Czaja
*Assistant Examiner*—Thomas Bokan
*Attorney, Agent, or Firm*—Becker & Becker, Inc.

[57] ABSTRACT

A tire pressure regulating unit for modifying the air pressure in vehicle tires while traveling. Shutters, which are arranged between the tire and the tire control valve, have parallel-connected auxiliary valves which release an additional passage cross-section when the regulation pressure decreases. The shutters may also be provided on the other side of the tire control valve in the work line in the region of the wheel hub, with rapid release valves being connected in parallel to the shutters and permitting bleeding to the atmosphere upon a decrease of regulation pressure. In this way short bleeding times are achieved even for low regulation pressures.

5 Claims, 19 Drawing Figures

Fig. 1
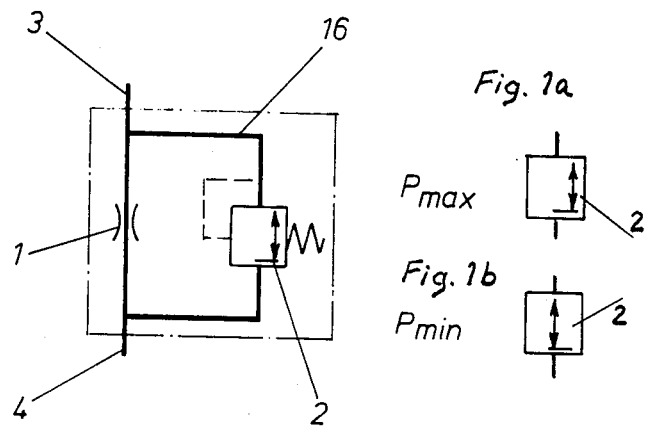
Fig. 1a
$P_{max}$
Fig. 1b
$P_{min}$
Fig. 2
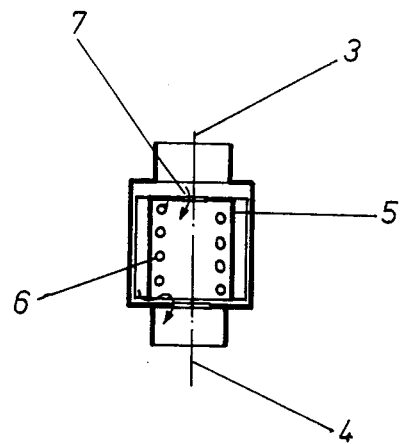

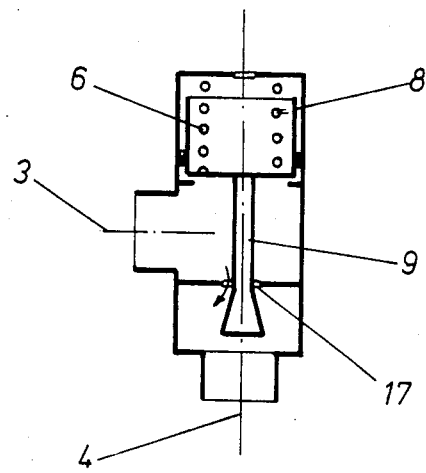
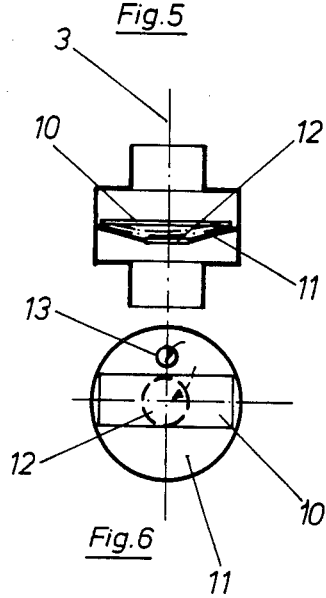
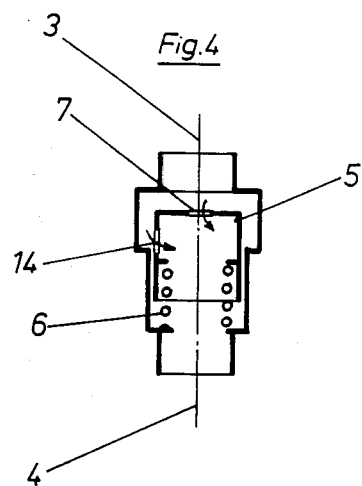
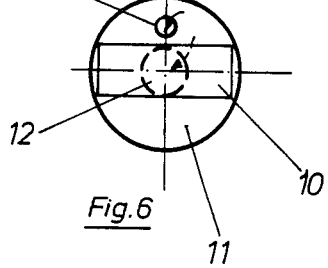

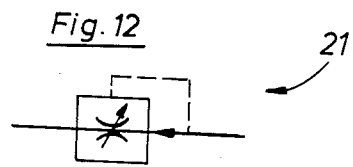
Fig. 12
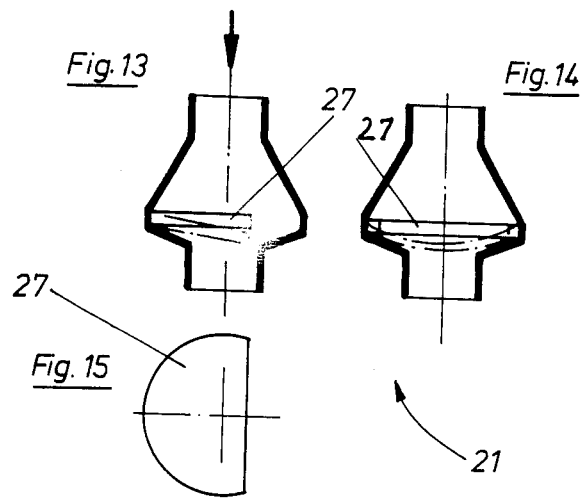
Fig. 13   Fig. 14
Fig. 15
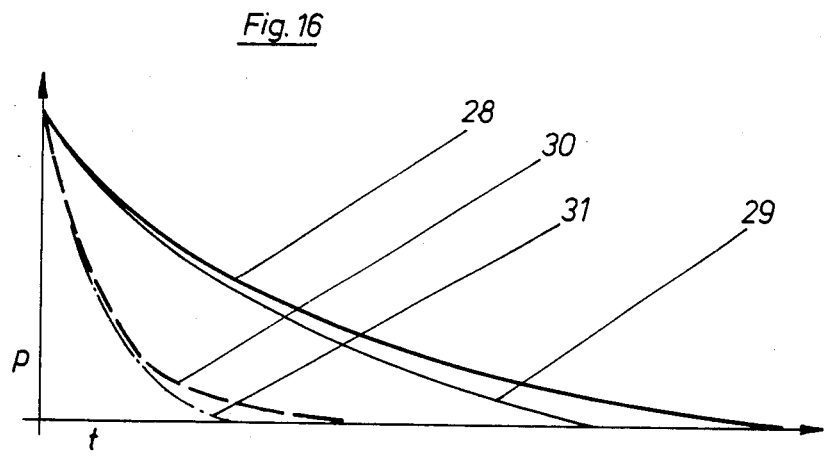
Fig. 16

TIRE PRESSURE REGULATING UNIT

BACKGROUND OF THE INVENTION

1. Field of the Invention

The present invention relates to a tire pressure regulating installation or unit for modifying the air pressure in vehicle tires while traveling, and includes a compressed air source which is connected to the tire via supply lines, in which rotors, control valves with shutters, and at least one adjustable regulator valve with modulated relay valve are included.

2. Description of Prior Art

Tire pressure regulating units of the aforementioned general type are known in several forms, such as from German Pat. No. 27 36 603. A principal problem with tire pressure regulating units is that the control operations and also the work operations have to be realized via a single line, because it is impossible to realize the installation of a second rotor in the axle. For this reason, it is necessary to provide a shutter between the control valve and the tire, even if such a throttle means opposes the aim of rapid inflation and bleeding. The shutter must be extremely small in conformity with the highest tire regulation pressure. This results in substantial throttling of the air passage at low regulation pressures, and consequently long bleeding times.

An object of the present invention is to provide a tire pressure regulating unit with control valves and shutters in the tires of the type initially mentioned, wherein, by the use of simple means, short bleeding times are obtained even for low regulation pressures.

BRIEF DESCRIPTION OF THE DRAWINGS

This object, and other objects and advantages of the present invention, will appear more clearly from the following specification in conjunction with the accompanying drawings, in which:

FIG. 1 is a diagrammatic circuit diagram of an auxiliary valve in parallel with the shutter in the tire of one inventive embodiment of a tire pressure regulating unit;

FIGS. 1a and 1b show the auxiliary valve in the blocked and through positions;

FIG. 2 shows one exemplary embodiment of an auxiliary valve in a diagrammatic axial section;

FIG. 3 is a diagrammatic axial section of a different embodiment of an auxiliary valve;

FIG. 4 shows a further auxiliary valve with variable throttling at lower tire pressures;

FIGS. 5 and 6 show a spring plate auxiliary valve in an axial section and a radial section respectively;

FIG. 12 is a diagrammatic circuit diagram of a discrete shutter, not structurally combined with a rapid release valve, between the control valve and the rotor of a wheel;

FIGS. 13, 14, and 15 show a discrete variable shutter according to the circuit diagram of FIG. 12 in two cross-sectional views and a plan view respectively of the diaphragm of the shutter; and FIG. 16 is a bleed diagram of the rapid release valves with shutter according to the embodiments of FIGS. 10 and 11 in comparison with the prior art and in comparison with an embodiment of the first alternative of the invention.

SUMMARY OF THE INVENTION

Figure 7:
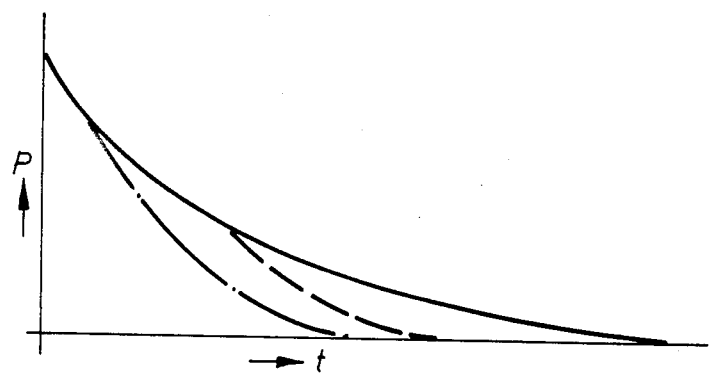
FIG. 7 is a bleed diagram of the auxiliary valves, including shutter, of FIGS. 2 to 6.

The tire pressure regulating unit of the present invention can be characterized in that an auxiliary valve is connected in parallel with the shutter, which is arranged between the control valve and the tire, and releases an additional passage cross-section upon a decrease of the regulation pressure.

The auxiliary valve, which according to the invention is connected in parallel with the shutter, and which releases an additional passage cross-section upon a decrease of the regulation pressure, also reduces substantial throttling of the air passage at lower regulation pressures. The bleeding times, which are preferred in the majority of cases of use of a tire pressure regulating unit, are therefore shorter. This is of particular significance in the case of largevolume tires such as on cross-country vehicles, with which long bleeding times were up to now encountered.

The auxiliary valve may be constructed as a 2/2 way or slide valve.

It is, however, particularly advantageous if the auxiliary valve is a pressure-controlled valve which can be loaded by the regulation pressure. The auxiliary valve preferably has a valve element which is resiliently pretensioned in the direction of the tire pressure, with the resilient pretension acting in the opening direction of the valve.

The valve element is expediently a cup-like valve piston in which a compression spring is at least partly housed. This results in a compact construction. The cup-like valve piston may be applied by the top circumferential edge thereof against a housing wall to close the valve. Alternatively, however, valve openings may be provided in the outer circumference, which releases different additional flow cross-sections in conformity to the axial position of the valve piston. By this means appropriate throttle cross-sections may be associated with individual regulation pressures, so that short bleeding times can be established in each operating case.

It is particularly expedient if the actual shutter between the control valve and the tire is integrated with the auxiliary valve. One possibility of integration exists if the cup-like valve piston has a bottom passage of constant cross-section as the shutter.

In a further embodiment, provision is made that the pressure control valve has a valve piston having a central valve stem part which is constructed as a cone or plug valve. In this case, the valve piston itself does not lie in the flow direction; rather, the regulation pressurized air is fed into the tire laterally.

Another embodiment is characterized in that the valve element is a spring plate which can be placed against a stable plate support having a central opening to close the valve. Here again the shutter may be integrated with the valve; for example, the stable plate support, as the shutter, may have a lateral passage opening of constant crosssection which is released independently of any spring plate position.

A particularly compact construction with a minimum of necessary control lines is obtained if the control valve and the auxiliary valve including shutter are combined structurally, or are connected directly to one another, in the tire.

The shutter may expediently have a variable crossection which becomes smaller at higher regulation pressures.

The tire pressure regulating unit of the present invention can be characterized not only by the above-described auxiliary valve, but also, in an alternative and particularly advantageous further development, can be characterized by a rapid release valve which is connected in parallel with a shutter, which in turn is arranged ahead of the control valve, i.e., between the control valve and the rotor; when the regulation pressure decreases, the rapid release valve opens in a pressure-controlled manner and permits an atmospheric bleeding of pressurized air. Due to the additional rapid release valve on the hub, the duration of the bleeding of the tire (pressure decrease) is substantially reduced (even in comparison with the above-mentioned embodiments of the invention). Up to now it was impossible to employ rapid release valves, because no pressure adjustment was possible without a shutter bypass. By means of a shutter bypass on a known rapid release valve, a complete balancing of pressure is achieved in the final phase of the bleeding. The line from the relay valve to the control valve or pressure maintaining valve in the hub is used thereby simultaneously as a work line and as a control line. A particular advantage of this embodiment of the invention is that a substantially smaller bore (approximately 3 mm in diameter, for example) is sufficient for the air passage in the wheel hub. This results in a smaller structural outlay for special parts.

The shutter cross-section is coordinated with the pressure of the volume to be bled together with the closing pressure of the pressure maintaining valve, and with the flow resistance of the line (hub) leading to the relay valve.

If the shutter has a constant cross-section, then it must be coordinated with the highest initial bleed pressure.

It is therefore advantageous to construct a shutter of variable effective cross-section which is controlled directly by the bleed pressure and increases as the pressure decreases. The variable shutter reduces the time phase of the pressure balancing, as soon as the rapid release valve begins to close. The characteristic of the shutter cross-sectional modification is achieved, for example, by the provision of a diaphragm or the shape of a shutter (groove) cross-section.

. The rapid release valve and the shutter may be structurally integrated, for example by being integrated structurally with the control valve, or by being annexed directly thereto.

The invention also utilizes the discovery that, from the standpoint of shorter bleeding times of tire pressure regulating units, throttling processes in the stationary supply lines and at the axle passage are not relevant; on the contrary, as regards components, the control valve and the connecting hose to the tire, including shutters provided, are primarily critical for the bleeding time.

This is where a remedy is supplied by the inventive auxiliary valve, or in the alternative development by the inventive rapid release valve, because it is fundamentally impossible to dispense with the shutter for the reasons initially stated.

DESCRIPTION OF PREFERRED EMBODIMENTS

Referring now to the drawings in detail, the circuit diagram illustrated in FIG. 1 relates to a part of a tire pressure regulating installation or unit for modifying the air pressure in vehicle tires while traveling.

The tire pressure regulating unit comprises structural elements known per se, such as a source of compressed air, supply lines, rotors, control valves with following shutters, and adjustable regulator valves with modulated relay valves, which are known per se and not illustrated, since they are not of further interest for the present invention.

Control valves, which are present on the wheels, on their output side have a line 4 leading to a shutter 1; the line 3 beyond the shutter leads as a connecting hose to the tire of which the pressure is to be regulated.

An auxiliary valve 2, which is connected in parallel with the shutter 1 via a branch line 16, releases an additional passage cross-section upon a decrease of the regulation pressure, as will be described in detail below. The auxiliary valve 2 is constructed as a 2/2 way or slide valve and switches into the "through position" at a minimum regulation pressure $P_{min}$, whereas at maximum regulation pressure $P_{max}$, the way valve is blocked (as symbolized in FIGS. 1a and 1b). As a result, at low regulation pressure, an additional flow cross-section is released in addition to the throttle crosssection of the shutter 1; this is a factor in a short bleed time of the tire pressure regulating unit.

Various exemplary embodiments of auxiliary valves 2 are shown in FIGS. 2 to 6.

According to the exemplary embodiment of FIG. 2, a cup-like valve piston 5, in which a compression spring 6 is housed, is arranged in a graduated valve housing which is symmetrical in rotation. The compression spring 6 is braced in the interior of the cup-shaped valve piston 5 against the bottom, and presses with its outer end against a housing wall in such a way that the valve piston 5 is pretensioned resiliently in the direction of the line 3 to the tire.

The bottom of the valve piston 5 contains a central passage 7 which acts as the shutter 1 of the circuit of FIG. 1. The open circumferential edge of the valve piston 5 serves as the valve closure element of the auxiliary valve, which can be applied against a valve housing wall to form a seal.

In operation, the compression spring 6 is tensioned at high regulation pressures: the cup edge of the valve piston 5 sealingly abuts the associated housing wall. In this operating state, a bleeding of the tire is possible only through the central passage 7. If the regulation pressure decreases, then the valve piston 5 is lifted and releases a circumferential additional flow cross-section to the control valve. The additional flow cross-section released is a function of the valve of the pressure to be regulated.

The auxiliary valve illustrated in FIG. 3 comprises a cup-like valve piston 8 with an internal compression spring 6, similar to the exemplary embodiment of FIG. 2. The valve piston 8 has a central valve stem part 9 which releases an inner passage 17 at low regulation pressures, so that a flow cross-section from the tire to the control valve is released. The shutter 1 of FIG. 1 is not integrated with the auxiliary valve 2 of FIG. 3.

The auxiliary valve illustrated in FIG. 4 likewise comprises a cup-like valve piston 5 with an internal compression spring 6 and a bottom passage 7 as the shutter 1. Furthermore, the valve piston 5 on its outer circumference has valve openings 14, which release an auxiliary air passage at low regulation pressures and are closed at higher regulation pressures.

The exemplary embodiment of an auxiliary valve illustrated in FIGS. 5 and 6 also has an integrated shutter 1 in the form of a lateral opening 13 in a plate support 11, which is fixedly disposed in a valve housing which is symmetrical in rotation. The plate support 11 has a central opening 12 of larger cross-section which can be closed by a spring plate 10 which is resiliently pretensioned in the direction of the tire. In the closed state of the central opening 12, the spring plate 10 is resiliently deflected and abuts the plate support 11, closing the valve.

FIG. 7 shows the bleed diagram of the auxiliary valves of FIGS. 2 to 6, with the regulation pressure P being plotted against the bleed time t. The solid line in the bleed diagram shows the bleed curve through the shutter 1 and/or the openings 7 and 13 of the auxiliary valves of FIGS. 2, 4 and 5. The bleed curve of the actual auxiliary valve of FIG. 2 is represented by the dash line, whereas the dot-dash line is associated with the valves of FIGS. 3 to 6.

Figure 8:
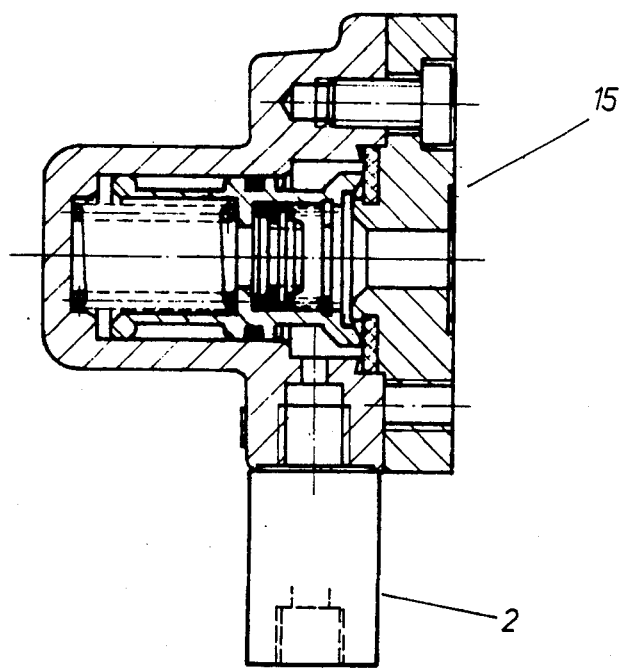
FIG. 8 shows an auxiliary valve in direct arrangement with a known tire control valve.

It is not only the shutter 1 which may be integrated with the auxiliary valve 2. The latter itself may be directly connected structurally to the control valve 15 of the tire, as is shown in FIG. 8 for example.

In FIGS. 9 to 16 the invention is illustrated with reference to a plurality of embodiments according to a second coordinated alternative of the present invention, which fundamentally does not provide a shutter between control valve and tire, but rather has a shutter on the other side of the control valve between the latter and the relay valve on the wheel hub. The shutter 21 also has a line 18 to the control valve and a line 19 to the rotor and/or to the relay valve. A rapid release valve 20, which has an atmospheric bleed means 16, is connected operatively in parallel with the shutter 21. The rapid release valve 20 is controlled upon a decrease of the regulation pressure, as is shown symbolically by a dash line in FIG. 9.

Figure 9:
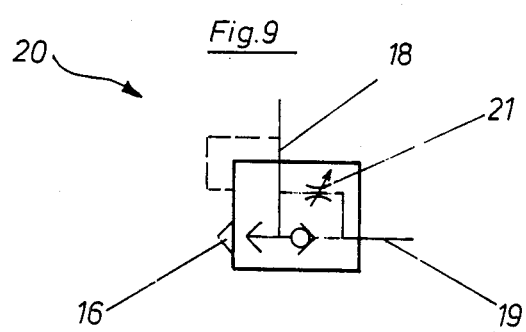
FIG. 9 is a diagrammatic circuit diagram of a rapid release valve in parallel with the shutter arranged between control valve and rotor on the wheel of a vehicle having a tire pressure regulating unit.
Figure 10:
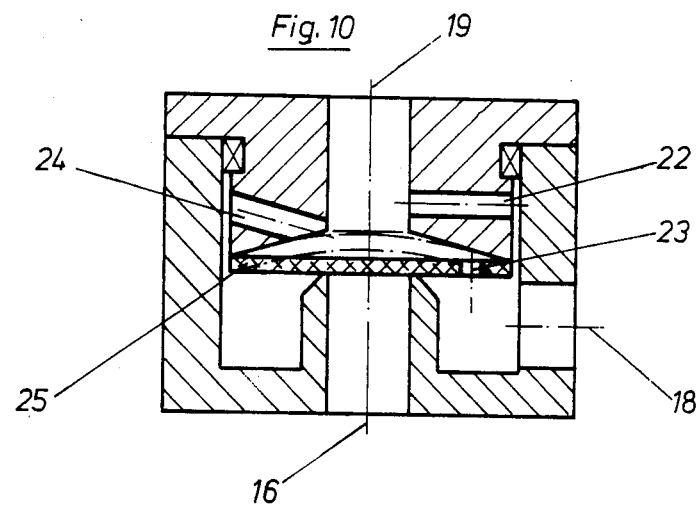
FIG. 10 shows an exemplary embodiment of a unit comprising a rapid release valve and a variable shutter in a diagrammatic axial section.
Figures 11, 11A:
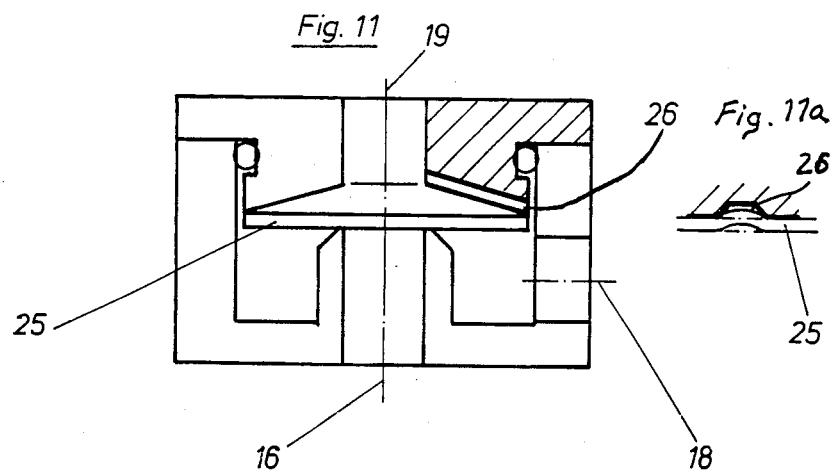
FIG. 11 is a diagrammatic axial section of another embodiment of a unit comprising a rapid release valve and a shutter according to the circuit diagram of FIG. 9.
FIG. 11a is a partial cross section of the arrangement of FIG. 11.

The shutter 21, which has a constant effective cross-section, or preferably a variable cross-section which is directly controlled by the bleed pressure and becomes greater with decreasing pressure, as well as the rapid release valve 20 of FIG. 9, are composed structurally as shown in FIGS. 10 or 11, for example.

The exemplary embodiment of a unit, comprising a rapid release valve 20 and a variable shutter 21 illustrated in FIG. 10, has shutter passages 22 and 23 of (any desired) constant cross-section. A circular or annular form may be provided, for example. The shutter passage 22 connects the line 19 to the line 18.

The exemplary embodiment of FIG. 10 furthermore has a shutter passage 23 and 24 of variable cross-section between the line 19 and the line 18. The variable cross-ssection is obtained in that the resilient diaphragm 25 provided in the rapid release valve 20, in the case of deflection, rests partially against the inner opening of the shutter passage 24 and thereby reduces the cross-section of the shutter passage 24 at higher bleed pressure or control pressure. The shutter passage 23 functions analogously.

The exemplary embodiment illustrated in FIG. 11 provides, for a variable shutter, an internal radial groove 26 on the control valve side in the region of the diaphragm 25. At a higher bleed pressure, the diaphragm 25 is pressed partly into the radial groove 26, so that the cross-section of the latter is modified. A free minimum cross-section remains in the radial groove 26, even at maximum regulation pressure, in order to maintain a minimum shutter effect.

FIG. 12, in a manner similar to FIG. 9, shows a diagrammatic circuit diagram of a discrete variable shutter 21 which is not combined structurally with a rapid release valve. A variable shutter of this type is structurally embodied as shown in FIGS. 13, 14 and 15, for example, and has an internal deflectable diaphragm 27 which releases different passage cross-sections upon pressure variation.

A variable shutter 21 as an individual device also may be constructed according to FIGS. 5 and 6.

FIG. 16 illustrates the bleed diagram of a rapid release valve 20 with a shutter 21 in various configurations in comparison with the prior art, and in comparison with the first alternative of the invention; the regulation pressure P is plotted against the bleed time t. The solid line 28 in the bleed diagram shows the bleed curve according to the prior art with a control valve and with a fixed shutter between the control valve and the tire. The solid line 29 describes the improved bleed characteristic of a variable shutter which is arranged between the control valve and the tire. The bleed curve according to the dash line 30 characterizes a system according to the invention with a rapid release valve and with a shutter bypass having a fixed shutter, for example according to the exemplary embodiment of FIG. 10 omitting the shutter passage 24. Still better bleed conditions are achieved according to the dot-dash line 31 in the case of a system with a rapid release valve and with a variable shutter, according to FIGS. 10 and 11, for example.

The present invention is, of course, in no way restricted to the specific disclosure of the specification and drawings, but also encompasses any modifications within the scope of the appended claims.

What I claim is:

1. In a tire pressure regulating unit for modifying the air pressure in vehicle tires while traveling and rotatable with a wheel on which the tire is mounted said wheel having an outer side; the unit includes a source of compressed air which is connected to the tires via supply lines in which are included rotors, control valves, shutters disposed and connected operatively in line between the latter and the tires, and at least one adjustable regulator valve having a modulated relay valve; the improvement in combination therewith comprising:

a rapid release valve, which includes a valve element in the form of a resilient diaphragm and which is connected in line intermediate a control valve and the rotor said control valve intermediate said rapid release valve and said tire and an orifice which is operatively connected in parallel with the rapid release valve which permits a continuously atmospheric bleeding and discharge of air from the tire directly to the outer side of the wheel when the adjusted regulating pressure at the regulator valve, is lower than present tire pressure to permit an exact assimilation of the tire pressure with the regulating pressure.

2. A unit in combination according to claim 1, in which at least one of said shutters has a variable effective cross-section which is controlled directly by the bleed pressure and increases as the pressure decreases.

3. A unit in combination according to claim 2, in which said rapid release valve and the said at least one of said shutters are structurally integrated.

4. A unit in combination according to claim 3, in which said rapid release valve and the said at least one of said shutters are integrated structurally in said control valve.

5. A unit in combination according to claim 3, in which said rapid release valve and the said at least one of said shutters are connected directly to said control valve.

* * * * *